(12) United States Patent
Zhang et al.

(10) Patent No.: US 8,755,928 B2
(45) Date of Patent: Jun. 17, 2014

(54) AUTOMATIC SELECTION OF REFERENCE SPECTRA LIBRARY

(75) Inventors: Jimin Zhang, San Jose, CA (US); Harry Q. Lee, Los Altos, CA (US); Zhihong Wang, Santa Clara, CA (US); Jeffrey Drue David, San Jose, CA (US); Boguslaw A. Swedek, Cupertino, CA (US); Dominic J. Benvegnu, La Honda, CA (US)

(73) Assignee: Applied Materials, Inc., Santa Clara, CA (US)

( * ) Notice: Subject to any disclaimer, the term of this patent is extended or adjusted under 35 U.S.C. 154(b) by 395 days.

(21) Appl. No.: 13/095,802

(22) Filed: Apr. 27, 2011

(65) Prior Publication Data

US 2012/0276814 A1     Nov. 1, 2012

(51) Int. Cl.
*G06F 19/24*     (2011.01)

(52) U.S. Cl.
USPC ........... 700/164; 700/121; 700/103; 700/105; 700/160; 700/173

(58) Field of Classification Search
None
See application file for complete search history.

(56) References Cited

U.S. PATENT DOCUMENTS

| | | | |
|---|---|---|---|
| 5,846,882 A | 12/1998 | Birang | |
| 6,719,818 B1 | 4/2004 | Birang | |
| 6,768,983 B1 * | 7/2004 | Jakatdar et al. | 706/46 |
| 6,785,638 B2 * | 8/2004 | Niu et al. | 702/189 |
| 6,898,596 B2 * | 5/2005 | Aikens et al. | 707/758 |
| 6,924,641 B1 | 8/2005 | Hanawa et al. | |
| 7,069,153 B2 * | 6/2006 | Johnson | 702/28 |
| 7,305,322 B2 * | 12/2007 | Funk et al. | 702/155 |
| 7,409,260 B2 * | 8/2008 | David et al. | 700/160 |
| 7,451,054 B2 * | 11/2008 | Deshpande et al. | 702/134 |
| 7,487,053 B2 * | 2/2009 | Funk et al. | 702/66 |
| 7,513,818 B2 | 4/2009 | Miller et al. | |
| 7,840,375 B2 * | 11/2010 | Ravid et al. | 702/172 |
| 8,260,446 B2 * | 9/2012 | David et al. | 700/109 |
| 2007/0039925 A1 | 2/2007 | Swedek et al. | |
| 2007/0042675 A1 | 2/2007 | Benvegnu et al. | |
| 2007/0224915 A1 * | 9/2007 | David et al. | 451/5 |
| 2008/0099443 A1 * | 5/2008 | Benvegnu et al. | 216/84 |
| 2008/0206993 A1 * | 8/2008 | Lee et al. | 438/692 |
| 2009/0275265 A1 | 11/2009 | Qian et al. | |
| 2010/0103422 A1 | 4/2010 | David et al. | |

(Continued)

OTHER PUBLICATIONS

Chan, D.A.; Swedek, Bogdan; Wiswesser, A.; Birang, M., "Process control and monitoring with laser interferometry based endpoint detection in chemical mechanical planarization," Advanced Semiconductor Manufacturing Conference and Workshop, 1998. 1998 IEEE/SEMI , vol., No., pp. 377,384, Sep. 23-25, 1998.*

*Primary Examiner* — Kavita Padmanabhan
*Assistant Examiner* — Christopher E Everett
(74) *Attorney, Agent, or Firm* — Fish & Richardson P.C.

(57) ABSTRACT

A computer-implemented method of generating reference spectra includes polishing a plurality of set-up substrates, the plurality of set-up substrates comprising at least three set-up substrates, measuring a sequence of spectra from each of the plurality of set-up substrates during polishing with an in-situ optical monitoring system to provide a plurality of sequences of spectra, generating a plurality of sequences of potential reference spectra from the plurality of sequences of spectra, determining which sequence of potential reference spectra of the plurality of sequences provides a best match to remaining sequences of the plurality of sequences, and storing the sequence of potential reference spectra determined to provide the best match as reference spectra, and selecting and storing the sequence of potential reference spectra.

21 Claims, 7 Drawing Sheets

(56) References Cited

U.S. PATENT DOCUMENTS

| | | |
|---|---|---|
| 2010/0105228 A1 | 4/2010 | Lai et al. |
| 2011/0269377 A1* | 11/2011 | Qian et al. ......... 451/5 |
| 2012/0034845 A1* | 2/2012 | Hu et al. ......... 451/5 |
| 2012/0100781 A1* | 4/2012 | Zhang et al. ......... 451/6 |

* cited by examiner

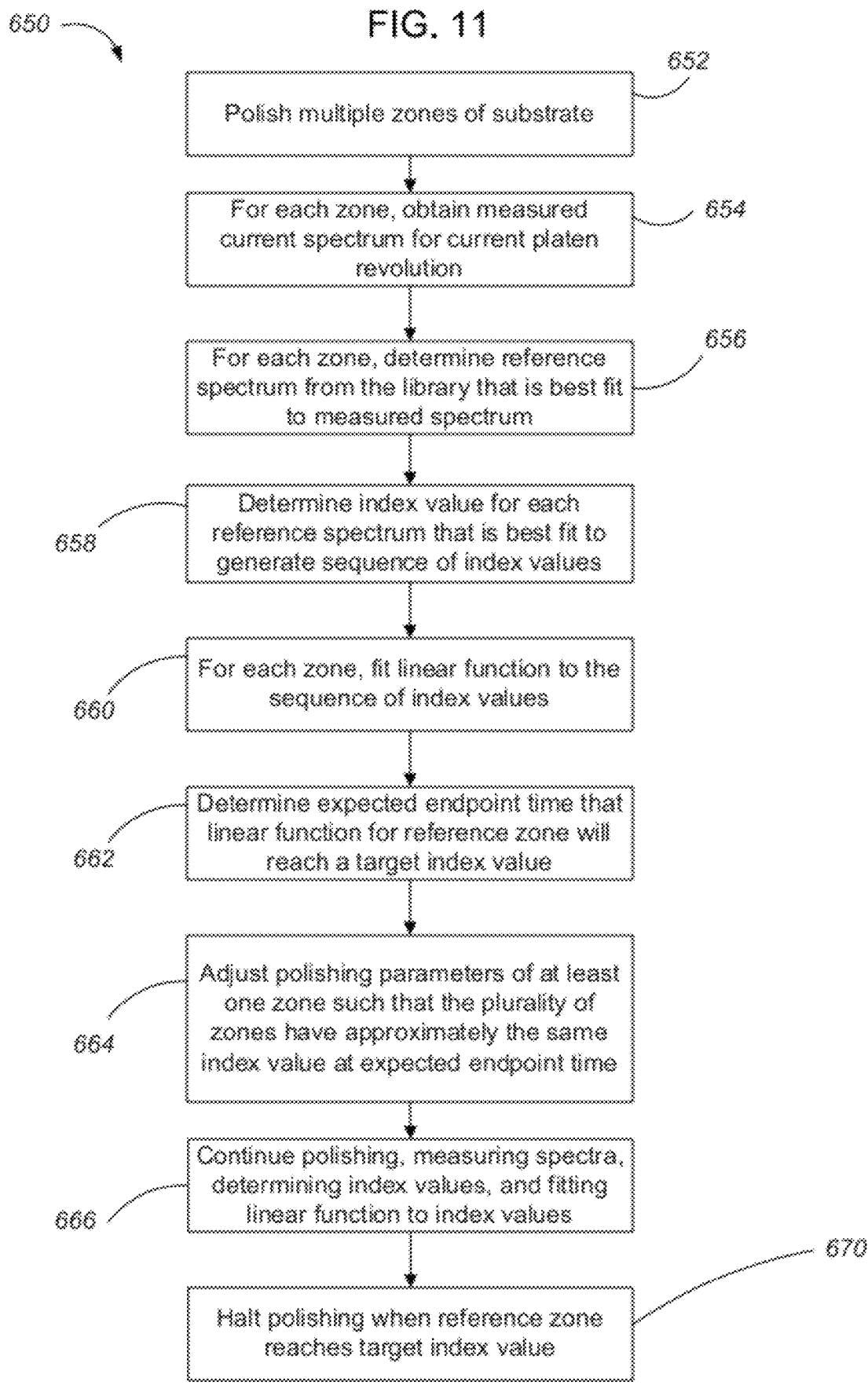

A US 8,755,928 B2

AUTOMATIC SELECTION OF REFERENCE SPECTRA LIBRARY

TECHNICAL FIELD

The present disclosure relates generally to the selection of a library of reference spectra for optical monitoring, e.g., during chemical mechanical polishing.

BACKGROUND

An integrated circuit is typically formed on a substrate by the sequential deposition of conductive, semiconductive, or insulative layers on a silicon wafer. One fabrication step involves depositing a filler layer over a non-planar surface and planarizing the filler layer. For certain applications, the filler layer is planarized until the top surface of a patterned layer is exposed. A conductive filler layer, for example, can be deposited on a patterned insulative layer to fill the trenches or holes in the insulative layer. After planarization, the portions of the conductive layer remaining between the raised pattern of the insulative layer form vias, plugs, and lines that provide conductive paths between thin film circuits on the substrate. For other applications, such as oxide polishing, the filler layer is planarized until a predetermined thickness is left over the non planar surface. In addition, planarization of the substrate surface is usually required for photolithography.

Chemical mechanical polishing (CMP) is one accepted method of planarization. This planarization method typically requires that the substrate be mounted on a carrier head. The exposed surface of the substrate is typically placed against a rotating polishing pad with a durable roughened surface. The carrier head provides a controllable load on the substrate to push it against the polishing pad. A polishing liquid, such as a slurry with abrasive particles, is typically supplied to the surface of the polishing pad.

One problem in CMP is using an appropriate polishing rate to achieve a desirable profile, e.g., a substrate layer that has been planarized to a desired flatness or thickness, or a desired amount of material has been removed. Variations in the initial thickness of a substrate layer, the slurry composition, the polishing pad condition, the relative speed between the polishing pad and a substrate, and the load on a substrate can cause variations in the material removal rate across a substrate, and from substrate to substrate. These variations cause variations in the time needed to reach the polishing endpoint and the amount removed. Therefore, it may not be possible to determine the polishing endpoint merely as a function of the polishing time, or to achieve a desired profile merely by applying a constant pressure.

In some systems, a substrate is optically monitored in-situ during polishing, e.g., through a window in the polishing pad. However, existing optical monitoring techniques may not satisfy increasing demands of semiconductor device manufacturers.

SUMMARY

In one aspect, a computer-implemented method of generating reference spectra includes polishing a plurality of set-up substrates, the plurality of set-up substrates comprising at least three set-up substrates, measuring a sequence of spectra from each of the plurality of set-up substrates during polishing with an in-situ optical monitoring system to provide a plurality of sequences of spectra, generating a plurality of sequences of potential reference spectra from the plurality of sequences of spectra, determining which sequence of potential reference spectra of the plurality of sequences provides a best match to remaining sequences of the plurality of sequences, and storing the sequence of potential reference spectra determined to provide the best match as reference spectra, and selecting and storing the sequence of potential reference spectra.

Implementations can include one or more of the following features. Generating the plurality of sequences of potential reference spectra may include generating a sequence of potential reference spectra from each sequence of spectra. Measuring the sequence of spectra may include, at each time interval of a plurality of regular time intervals, collecting a plurality of spectra from a set-up substrate, and generating the sequence of potential reference spectra may include, for each time interval, generating a single potential reference spectrum from the plurality of spectra. Generating the single potential reference spectrum from the plurality of spectra may include averaging the plurality of spectra. Generating the potential reference spectrum from the plurality of spectra may include determining which spectrum from the plurality of spectra provides a best match to spectra from other set-up substrates collected in the same time interval. The plurality of regular time intervals may correspond to rotations of a platen supporting a polishing pad to polish the set-up substrate. Determining which sequence of potential reference spectra of the plurality of sequences provides the best match may include assigning an index value to each potential reference spectrum of the plurality of sequences of potential reference spectra. The index value may correspond to a number of rotations of a platen at a time of measurement of a spectrum of the sequence of spectra used to generate the potential reference spectrum. Determining which sequence of potential reference spectra of the plurality of sequences provides the best match comprises may include each sequence of potential reference spectra to each other sequence of the plurality of sequences of potential reference spectra. Comparing each sequence of potential reference spectra to each other sequence may include determining a difference between each potential reference spectrum of the each sequence of potential reference spectra only against potential reference spectra having a same index value. Comparing each sequence of potential reference spectra to each other sequence may include determining a difference between each potential reference spectrum of the each sequence of potential reference spectra from a first substrate against every potential reference spectrum from a second substrate. Determining which sequence of potential reference spectra of the plurality of sequences provides the best match may include determining a difference between each sequence of potential reference spectra and each other sequence of the plurality of sequences. Determining a difference between each sequence of potential reference spectra and each other sequence of the plurality of sequences may include determining a difference between each potential reference spectrum of the each sequence of potential reference spectra and a potential reference spectrum of the each other sequence having a same index value to generate a sequence of differences. Determining a difference between each sequence of potential reference spectra and each other sequence of the plurality of sequences may include summing the sequence of differences. Determining a difference between each potential reference spectrum and a potential reference spectrum of the each other sequence may include determining a sum of squared differentials or a sum of absolute differences. A product substrate may be polished, the product substrate may be optically monitored during polishing to generate measured spectra, and at least one of a polishing endpoint or an adjustment for a polishing rate of the product substrate may be determined, the determining including a comparison of the measured spectra to the reference spectra. Optically monitoring the product substrate during polishing to generate measured spectra may generate a sequence of measured spectra. For each measured spectrum in the sequence of measured spectra, a best matching reference spectrum from the reference spectra may be determined. For each best matching reference spectrum, an index value may be determined to generate a sequence of index values. A linear function may be fit to the sequence of index values. Optically monitoring the product substrate during polishing to generate measured spectra may generate a sequence of measured spectra for each zone of a plurality of zones on the product substrate, and determining a best matching reference spectrum from the reference spectra, determining an index value and fitting a linear function to the sequence of index values may be performed for each zone. A projected time at which at least one zone of the product substrate will reach the target index value may be determined based on the linear function. A polishing parameter for at least one zone on the product substrate may be adjusted to adjust the polishing rate of the at least one zone such that the at least one zone has closer to the target index at the projected time than without such adjustment. An endpoint may be detected based on a time that the linear function reaches a target index value.

In other aspects, polishing systems and computer-program products tangibly embodied on a computer readable medium are provided to carry out these methods.

Certain implementations may have one or more of the following advantages. Creation of a library of reference spectra can be automated, thus significantly reducing time required by the semiconductor foundry to begin polishing of a new device substrate (e.g., a substrate generated based on a new mask pattern). By selecting the best library from multiple potential libraries, reliability and consistency of the endpoint detection can be improved, thus reducing wafer-to-wafer non-uniformity. Endpoint detection can be performed using only a limited number of libraries, e.g., one library, in order to meet computer processing limitations.

The details of one or more implementations are set forth in the accompanying drawings and the description below. Other features, aspects, and advantages will become apparent from the description, the drawings, and the claims.

BRIEF DESCRIPTION OF THE DRAWINGS

FIG. 11 illustrates a method of polishing a product substrate using the library of reference spectra.

Like reference numbers and designations in the various drawings indicate like elements.

DETAILED DESCRIPTION

For optical monitoring systems used to monitor the spectra of reflected light from a substrate undergoing polishing, creation of reference spectra and a targets can be time-consuming. Creation of a library of reference spectra can automated, e.g., by measuring spectra from the first substrate of a lot and using the measured spectra as reference spectra. However, due to non-uniformity of semiconductor fabrication processes, there can be differences between the substrates in a lot. If the first substrate of the lot is an "outlier", i.e., generates a library of reference spectra that varies significantly from the library of reference spectra that would be generated by the other substrates in the lot, the likelihood of inaccurate endpoint detection increases. Although multiple libraries of reference spectra can be created from multiple set-up substrates, computer processing power places a practical limit on the number of libraries to which a measured spectrum can be compared while still operating with sufficient speed for in-situ monitoring.

However, if a plurality of set-up substrates are polished to generate a plurality of potential reference libraries, the potential reference library that provides the best match to the remainder of the potential reference libraries can be determined, e.g., by a round-robin comparison, and this potential reference library can be selected as the reference library. Thereafter, optical monitoring of subsequent product substrates can proceed using the reference spectra from the selected reference library. Thus, time required by the semiconductor foundry to begin polishing of a substrate with a new pattern can be significantly reduced, and reliability and consistency of the endpoint detection can be improved. In addition, endpoint detection can be performed using only a limited number of libraries, e.g., one library, in order to meet computer processing limitations.

Figure 1:
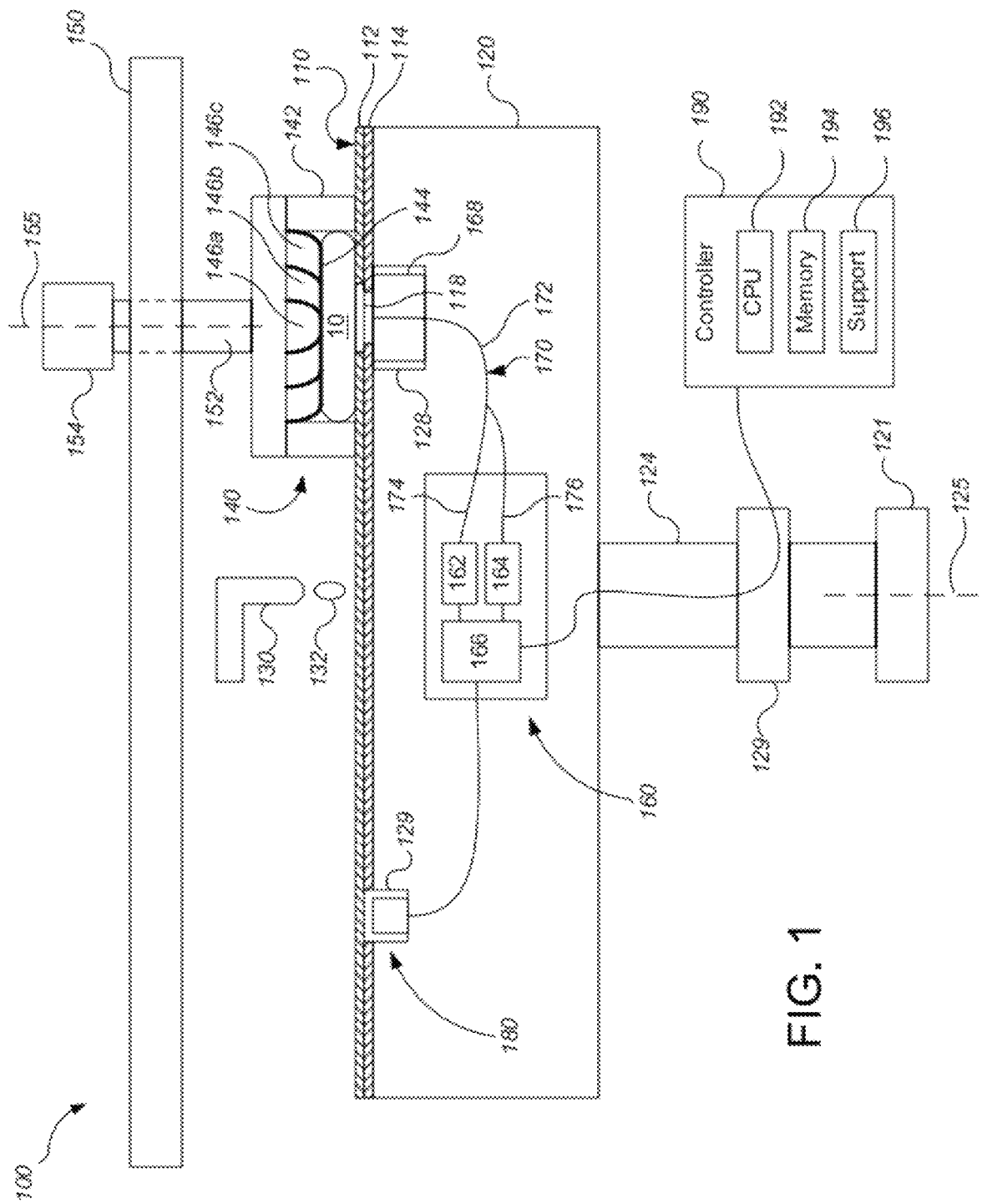
FIG. 1 illustrates a schematic cross-sectional view of an example of a polishing apparatus.

FIG. 1 illustrates an example of a polishing apparatus 100. The polishing apparatus 100 includes a rotatable disk-shaped platen 120 on which a polishing pad 110 is situated. The platen is operable to rotate about an axis 125. For example, a motor 121 can turn a drive shaft 124 to rotate the platen 120. The polishing pad 110 can be detachably secured to the platen 120, for example, by a layer of adhesive. The polishing pad 110 can be a two-layer polishing pad with an outer polishing layer 112 and a softer backing layer 114.

The polishing apparatus 100 can include a combined slurry/rinse arm 130. During polishing, the arm 130 is operable to dispense a polishing liquid 132, such as a slurry, onto the polishing pad 110. While only one slurry/rinse arm 130 is shown, additional nozzles, such as one or more dedicated slurry arms per carrier head, can be used. The polishing apparatus can also include a polishing pad conditioner to abrade the polishing pad 110 to maintain the polishing pad 110 in a consistent abrasive state.

Figure 2:
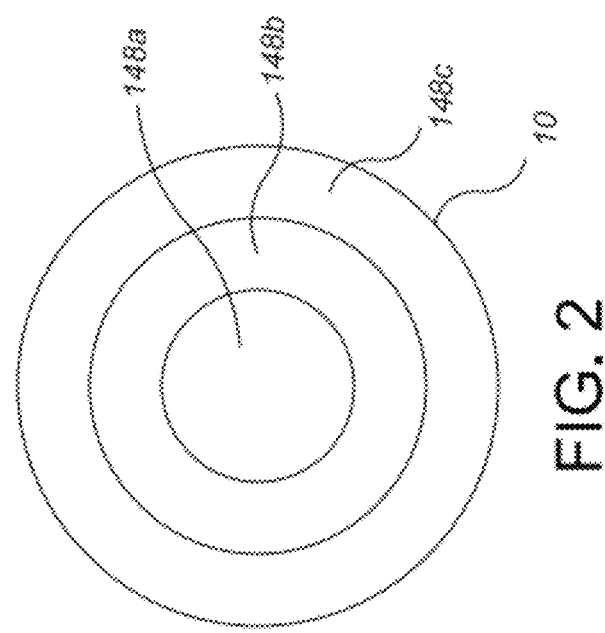
FIG. 2 illustrates a schematic top view of a substrate having multiple zones.

The polishing apparatus 100 includes at least one carrier head 140. The carrier head 140 is operable to hold a substrate 10 against the polishing pad 110. The carrier head 140 can include a retaining ring 142 to retain the substrate 10 below a flexible membrane 144. The carrier head 140 also includes a plurality of independently controllable pressurizable chambers defined by the membrane, e.g., three chambers 146a-146c, which can apply independently controllable pressurizes to associated zones 148a-148c on the flexible membrane 144 and thus on the substrate 10 (see FIG. 2). Referring to FIG. 2, the center zone 148a can be substantially circular, and the remaining zones 148b-148e can be concentric annular zones around the center zone 148a. Although only three chambers are illustrated in FIGS. 1 and 2 for ease of illustration, there could be two chambers, or four or more chambers, e.g., five chambers.

Returning to FIG. 1, the carrier head 140 is suspended from a support structure 150, e.g., a carousel, and is connected by a drive shaft 152 to a carrier head rotation motor 154 so that the carrier head can rotate about an axis 155. Optionally the carrier head 140 can oscillate laterally, e.g., on sliders on the carousel 150 or by rotational oscillation of the carousel itself. In operation, the platen is rotated about its central axis 125, and the carrier head is rotated about its central axis 155 and optionally translated laterally across the top surface of the polishing pad 110.

While only one carrier head 140 is shown, more carrier heads can be provided to hold additional substrates. In some implementations, the polishing apparatus 100 includes multiple carrier heads to press multiple substrates against the same polishing pad, e.g., so that the surface area of polishing pad 110 can be used efficiently. The number of carrier heads adapted to hold substrates for a simultaneous polishing on the same polishing pad can be based, at least in part, on the surface area of the polishing pad 110. In some implementations, the polishing apparatus 100 includes multiple carrier heads, but the carrier heads (and the substrates held) are located over different polishing pads rather than the same polishing pad. Each carrier head 140 can have independent control of the polishing parameters, for example pressure, associated with each respective substrate.

The polishing apparatus also includes an in-situ monitoring system 160, which can be used to determine whether to adjust a polishing rate or an adjustment for the polishing rate as discussed below. The in-situ monitoring system 160 can include an optical monitoring system, e.g., a spectrographic monitoring system.

An optical access through the polishing pad is provided by including an aperture (i.e., a hole that runs through the pad) or a solid window 118. The solid window 118 can be secured to the polishing pad 110, e.g., as a plug that fills an aperture in the polishing pad, e.g., is molded to or adhesively secured to the polishing pad, although in some implementations the solid window can be supported on the platen 120 and project into an aperture in the polishing pad.

The optical monitoring system 160 can include a light source 162, a light detector 164, and circuitry 166 for sending and receiving signals between a remote controller 190, e.g., a computer, and the light source 162 and light detector 164. One or more optical fibers can be used to transmit the light from the light source 162 to the optical access in the polishing pad, and to transmit light reflected from the substrate 10 to the detector 164. For example, a bifurcated optical fiber 170 can be used to transmit the light from the light source 162 to the substrate 10 and back to the detector 164. The bifurcated optical fiber an include a trunk 172 positioned in proximity to the optical access, and two branches 174 and 176 connected to the light source 162 and detector 164, respectively.

In some implementations, the top surface of the platen can include a recess 128 into which is fit an optical head 168 that holds one end of the trunk 172 of the bifurcated fiber. The optical head 168 can include a mechanism to adjust the vertical distance between the top of the trunk 172 and the solid window 118.

The output of the circuitry 166 can be a digital electronic signal that passes through a rotary coupler 129, e.g., a slip ring, in the drive shaft 124 to the controller 190 for the optical monitoring system. Similarly, the light source can be turned on or off in response to control commands in digital electronic signals that pass from the controller 190 through the rotary coupler 129 to the optical monitoring system 160. Alternatively, the circuitry 166 could communicate with the controller 190 by a wireless signal.

The light source 162 can be operable to emit white light. In one implementation, the white light emitted includes light having wavelengths of 200-800 nanometers. A suitable light source is a xenon lamp or a xenon mercury lamp.

The light detector 164 can be a spectrometer. A spectrometer is an optical instrument for measuring intensity of light over a portion of the electromagnetic spectrum. A suitable spectrometer is a grating spectrometer. Typical output for a spectrometer is the intensity of the light as a function of wavelength (or frequency).

As noted above, the light source 162 and light detector 164 can be connected to a computing device, e.g., the controller 190, operable to control their operation and receive their signals. The computing device can include a microprocessor situated near the polishing apparatus, e.g., a programmable computer. With respect to control, the computing device can, for example, synchronize activation of the light source with the rotation of the platen 120.

In some implementations, the optical monitoring system 160 is arranged so that the light beam rotates with the platen 120, e.g., by having the optical fiber 170 supported in a fixed position relative to the window 108 (and thus also rotate with the platen 120). In this case, the motion of the platen will cause the sensor to scan across each substrate. In particular, as the platen 120 rotates, the controller 190 can cause the light source 162 to emit a series of flashes starting just before and ending just after each substrate 10 passes over the optical access. Alternatively, the computing device can cause the light source 162 to emit light continuously starting just before and ending just after each substrate 10 passes over the optical access. In either case, the signal from the detector can be integrated over a sampling period to generate spectra measurements at a sampling frequency.

In operation, the controller 190 can receive, for example, a signal that carries information describing a spectrum of the light received by the light detector for a particular flash of the light source or time frame of the detector. Thus, this spectrum is a spectrum measured in-situ during polishing.

Figure 3:
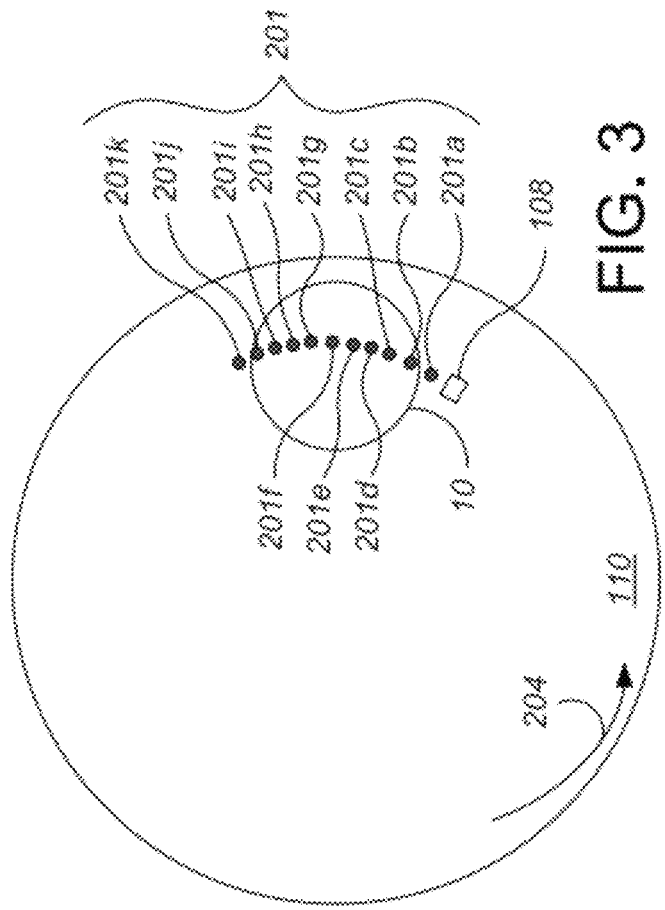
FIG. 3 illustrates a top view of a polishing pad and shows locations where in-situ measurements are taken on a substrate.

As shown by in FIG. 3, due to the rotation of the platen (shown by arrow 204), as the window 108 travels below the carrier head, the optical monitoring system making spectra measurements at a sampling frequency will cause the spectra measurements to be taken at locations 201 in an arc that traverses the substrate 10. For example, each of points 201a-201k represents a location of a spectrum measurement by the monitoring system of the substrate 10 (the number of points is illustrative; more or fewer measurements can be taken than illustrated, depending on the sampling frequency). As shown, over one rotation of the platen, spectra are obtained from different radii on the substrate 10. That is, some spectra are obtained from locations closer to the center of the substrate 10 and some are closer to the edge.

Thus, for any given scan of the optical monitoring system across a substrate 10, based on timing, motor encoder information, and optical detection of the edge of the substrate and/or retaining ring, the controller 190 can calculate the radial position (relative to the center of the particular substrate 10) for each measured spectrum from the scan. The polishing system can also include a rotary position sensor, e.g., a flange attached to an edge of the platen that will pass through a stationary optical interrupter, to provide additional data for determination of which substrate and the position on the substrate of the measured spectrum. The controller can thus associate the various measured spectra with the controllable zones 148b-148e (see FIG. 2) on the substrate 10. In some implementations, the time of measurement of the spectrum can be used as a substitute for the exact calculation of the radial position.

Over multiple rotations of the platen, for each zone, a sequence of spectra can be obtained over time. Without being limited to any particular theory, the spectrum of light reflected from the substrate 10, e.g., either a set-up or product substrate, evolves as polishing progresses (e.g., over multiple rotations of the platen rather than during a single sweep across the substrate) due to changes in the thickness of the outermost layer, thus yielding a sequence of time-varying spectra. Moreover, particular spectra are exhibited by particular thicknesses of the layer stack.

In some implementations, e.g., as part of determining a polishing endpoint or an adjustment for a polishing rate of a product substrate, the controller, e.g., the computing device, can be programmed to compare a measured spectrum to multiple reference spectra and determine which reference spectrum provides the best match. The controller can be programmed to compare each spectrum from a sequence of measured spectra to multiple reference spectra from a library to generate a sequence of best matching reference spectra. In particular, the controller can be programmed to compare each spectrum from a sequence of measured spectra from each zone to multiple reference spectra from a library to generate a sequence of best matching reference spectra for each zone.

As used herein, a reference spectrum is a predefined spectrum generated prior to polishing of the substrate, e.g., a product substrate, for which the reference spectrum will be used in determining a polishing endpoint or polishing rate adjustment. A reference spectrum can have a pre-defined association, i.e., defined prior to the polishing operation, with a value representing a time in the polishing process at which the spectrum is expected to appear, assuming that the actual polishing rate follows an expected polishing rate. Alternatively or in addition, the reference spectrum can have a pre-defined association with a value of a substrate property, such as a thickness of the outermost layer.

A reference spectrum can be generated empirically, e.g., by measuring the spectra from a set-up substrate. For example, to generate a plurality of reference spectra, a set-up substrate is polished using the same polishing parameters that would be used during polishing of product substrates while a sequence of spectra are collected. For each spectrum, a value is recorded representing the time in the polishing process at which the spectrum was collected. For example, the value can be an elapsed time, or a number of platen rotations. The substrate can be overpolished, i.e., polished past a desired thickness, so that the spectrum of the light that reflected from the substrate when the target thickness is achieved can be obtained.

In order to associate each spectrum with a value of a substrate property, e.g., a thickness of the outermost layer, the initial spectra and property of a "set-up" substrate with the same pattern as the product substrate can be measured pre-polish at a metrology station. The final spectrum and property can also be measured post-polish with the same metrology station or a different metrology station. The properties for spectra between the initial spectra and final spectra can be determined by interpolation, e.g., linear interpolation based on elapsed time at which the spectra of the test substrate was measured.

Figures 4, 5:
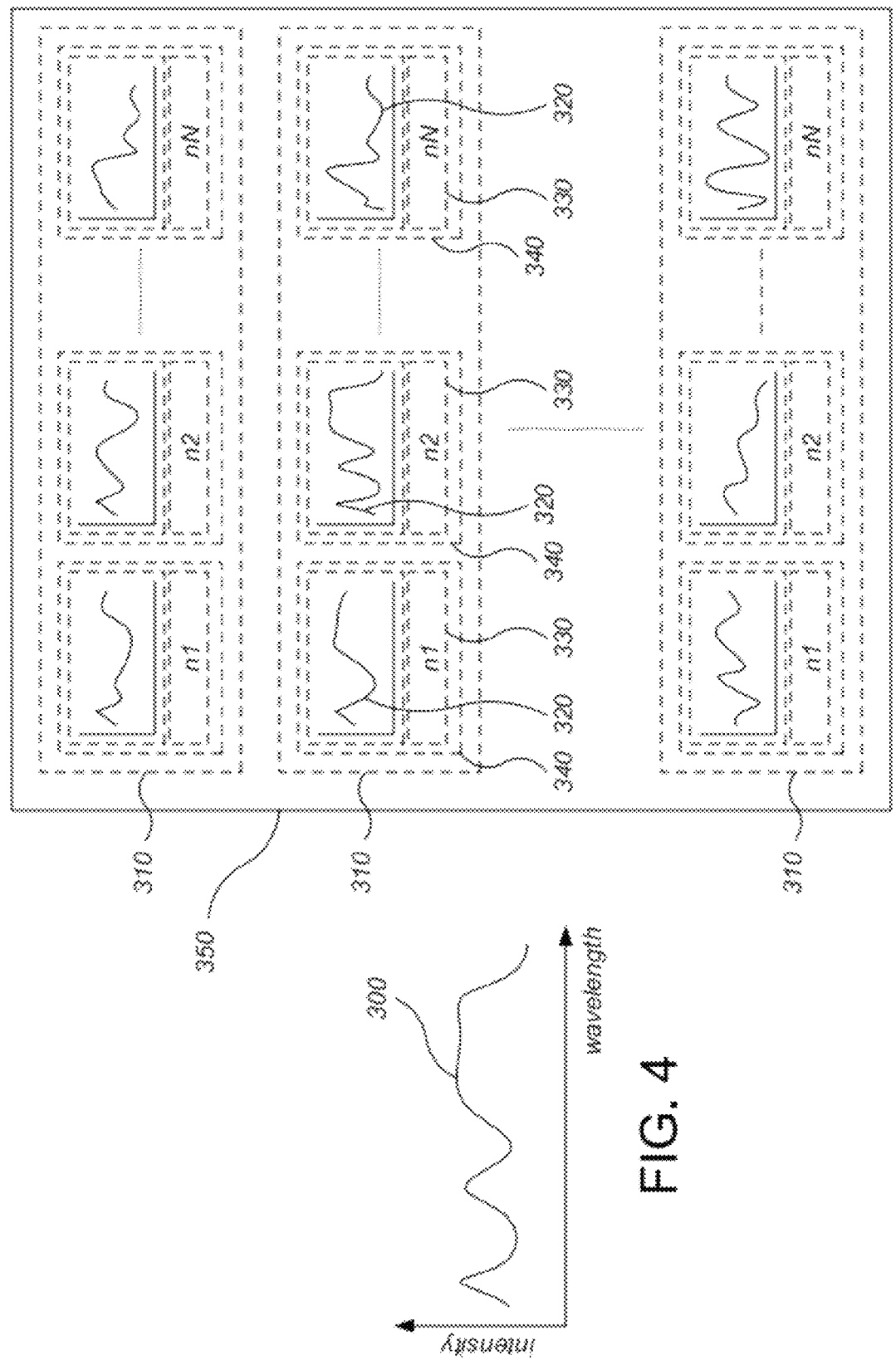
FIG. 4 illustrates a measured spectrum from the in-situ optical monitoring system.
FIG. 5 illustrates a library of reference spectra.

Referring to FIGS. 4 and 5, during polishing, a measured spectrum 300 (see FIG. 4) can be compared to reference spectra 320 from a library 310 of reference spectra (see FIG. 5). As used herein, a library of reference spectra is a collection of reference spectra which represent substrates that share a property in common. However, the property shared in common in a single library may vary across multiple libraries of reference spectra. For example, two different libraries can include reference spectra that represent substrates with two different underlying thicknesses. For a given library of reference spectra, variations in the upper layer thickness, rather than other factors (such as differences in wafer pattern, underlying layer thickness, or layer composition), can be primarily responsible for the differences in the spectral intensities.

Reference spectra 320 for different libraries 310 can be generated by polishing multiple "set-up" substrates, e.g., substrates with different substrate properties (e.g., underlying layer thicknesses, or layer composition), and collecting spectra as discussed above. The spectra from a first set-up substrate can provide a first library, the spectra from a second set-up substrate can provide a second library, and the spectra from a third set-up substrate can provide a third library.

In some implementations, each reference spectrum 320 is assigned an index value 330. In general, each library 310 can include many reference spectra 320, e.g., one or more, e.g., exactly one, reference spectra for each platen rotation over the expected polishing time of the substrate. This index 330 can be the value, e.g., a number, representing the time in the polishing process at which the reference spectrum 320 is expected to be observed. The spectra can be indexed so that each spectrum in a particular library has a unique index value. The indexing can be implemented so that the index values are sequenced in an order in which the spectra were measured. An index value can be selected to change monotonically, e.g., increase or decrease, as polishing progresses. In particular, the index values of the reference spectra can be selected so that they form a linear function of time or number of platen rotations (assuming that the polishing rate follows that of the model or test substrate used to generate the reference spectra in the library). For example, the index value can be proportional, e.g., equal, to a number of platen rotations at which the reference spectra was measured for the test substrate or would appear in the optical model. Thus, each index value can be a whole number. The index number can represent the expected platen rotation at which the associated spectrum would appear.

The reference spectra and their associated index values can be stored in a reference library. For example, each reference spectrum 320 and its associated index value 330 can be stored in a record 340 of database 350. The database 350 of reference libraries of reference spectra can be implemented in memory of the computing device of the polishing apparatus.

In some implementations, multiple potential libraries of potential reference spectra can be generated automatically from a lot of set-up substrates, and one of the potential libraries can be selected as the library 310 of reference spectra 320 to use for the endpoint detection and/or process control of a later device substrate.

Figures 6, 7:
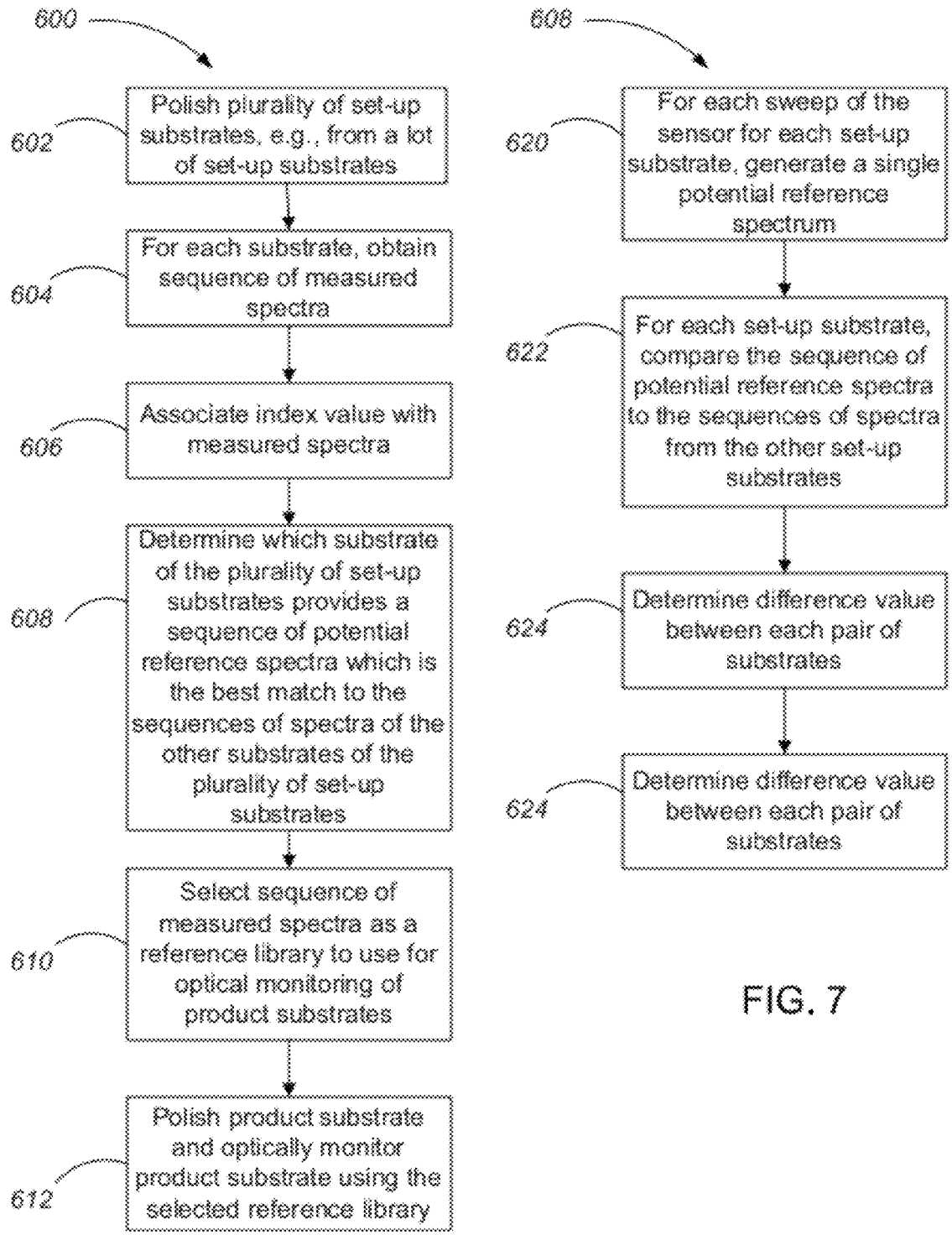
FIG. 6 illustrates a method of generating a library reference spectra.
FIG. 7 illustrates a method of determining which set-up substrate provides a sequence of potential reference spectra that has the best fit to the sequences of potential reference spectra from the other set-up substrates.

FIG. 6 illustrates a method 600 to automatically generate the library of reference spectra. A plurality of set-up substrates are polished (step 602), e.g., using the same polishing conditions. The plurality of set-up substrates can include at least three set-up substrates, e.g., three to twenty set-up substrates. The plurality set-up substrates are optically monitored during polishing (step 603). This optical monitoring measures a sequence of spectra from each of the plurality of set-up substrates to provide a plurality of sequences of set-up spectra. To measure the sequence of set-up spectra, a plurality of spectra from a set-up substrate can be collected at each time interval of a plurality of regular time intervals, e.g., for each rotation of platen. A single potential reference spectrum from the plurality of set-up spectra can be generated for each time interval. Alternatively, a single spectrum can be collected at each time interval of the plurality of regular time intervals, e.g., for each rotation of platen, and this single spectrum can be used as the potential reference spectrum.

A plurality of sequences of potential reference spectra are generated from the plurality of sequences of set-up spectra. A sequence of potential reference spectra can be generated for each set-up substrate of the plurality of set-up substrates (step 604). In some implementations, a sequence of potential reference spectra is generated for each zone of each set-up substrate. Each sequence of potential reference spectra can include at least one spectrum, e.g., exactly one spectrum, per sweep of the window below the substrate, e.g., per platen rotation.

The optical monitoring of the set-up substrates can be conducted using an optical monitoring system sufficiently similar to the optical monitoring system that will be used for monitoring of product substrates that substantially identical spectra would be generated from the systems. However, the endpoint detection and control of the polishing rate (discussed below with reference to FIG. 10) need not be performed for the set-up substrates. Rather, the set-up substrates can simply be polished for a preset duration, or another endpoint detection system 180 can be used to detect the polishing endpoint.

Each potential reference spectrum is associated with an index value (step 606), e.g., an elapsed time or a number of platen rotations at which the potential reference spectrum was measured.

The set-up substrate of the plurality of set-up substrates which provides the sequence of potential reference spectra having a best match to the sequences of potential reference spectra of the other substrates of plurality of substrates is determined (step 608).

Referring to FIG. 7, a process for determining the set-up substrate having the best match is described in greater detail. Initially, assuming that multiple spectra are accumulated for each sweep of the sensor below the set-up substrate, a potential reference spectrum is generated for each sweep from the multiple spectra (step 620). In some implementations, e.g., if multiple zones are not used, a single potential reference spectrum is generated for each sweep of each set-up substrate. In some implementations, e.g., if multiple zones are used, a single potential reference spectrum is generated for each sweep of each zone of each set-up substrate. Alternatively, if only one spectrum is acquired for each sweep of the sensor, then this step can be omitted.

In some implementations, for each sensor sweep of each set-up substrate, the multiple spectra accumulated for the sensor sweep are averaged to generate the potential reference spectrum for that sweep of that set-up substrate. If multiple zones are used, the multiple spectra accumulated for the sensor sweep of each zone can be averaged to generate the potential reference spectrum for that sweep of that zone of that set-up substrate.

In some implementations, for each sensor sweep of each set-up substrate, each spectrum from the sweep is compared against all other spectra of the other set-up substrates from the same sweep (i.e., having the same index value), and the spectrum having the best match to the all other spectra is selected as the potential reference spectrum for that sweep of that set-up substrate. The best match can be determined by accumulating the differences, e.g., a sum of squared deviations or a sum of absolute differences, between the spectrum and the other spectra of the other set-up substrates. If multiple zones are used, each spectrum from the sweep can be compared against all other spectra of the other set-up substrates from the same sweep (i.e., having the same index value) of the same zone, and the best match can be determined by accumulating the differences, e.g., a sum of squared deviations or a sum of absolute differences, between the spectrum and the other spectra for the same zone of the other set-up substrates. The spectrum having the smallest accumulated difference can be selected as the potential reference spectrum.

Since a potential reference spectrum is generated for each sweep of each set-up substrate (or for each sweep of each zone of each set-up substrate), a sequence of potential reference spectra is generated for each set-up substrate (or for each zone of each set-up substrate).

Next, for each set-up substrate, the sequence of potential reference spectra is compared against the other sequences of spectra from the other set-up substrates (step 622). Thus, each sequence of potential reference spectra can be compared to each other sequence of the plurality of sequences of potential reference spectra.

The comparison can be a round-robin comparison of each sequence of potential reference spectra against each other sequence of potential reference spectra. For example, a difference value $A_{ij}$ between each pair of set-up substrates can be calculated (step 624). For each sequence of potential reference spectra, the difference values against the other sequences can be summed. For example, assuming there are N set-up substrates S1, S2, S3 . . . , SN, the difference values can be represented by a table as follows:

| | S1 | S2 | S3 | . . . | SN | Sum of difference values |
|---|---|---|---|---|---|---|
| S1 | — | $A_{12}$ | $A_{13}$ | . . . | $A_{1N}$ | $A_{12} + A_{13} + \ldots + A_{1N}$ |
| S2 | $A_{21}$ | — | $A_{23}$ | . . . | $A_{2N}$ | $A_{21} + A_{23} + \ldots + A_{2N}$ |
| S3 | $A_{31}$ | $A_{32}$ | — | . . . | $A_{3N}$ | $A_{31} + A_{32} + \ldots + A_{3N}$ |
| . | | | | | | |
| . | | | | | | |
| SN | $A_{N1}$ | $A_{2N}$ | $A_{3N}$ | . . . | — | $A_{N1} + A_{N2} + \ldots + A_{(N-1)N}$ |

The comparison can be performed by comparing each potential reference spectrum only other potential reference spectra having the same index value (or within a particular predetermined range from the index value).

For example, in order to calculate a difference value $A_{ij}$ between two set-up substrate, e.g., S1 and S2, each potential reference spectrum from the sequence of potential reference spectra from the first substrate can be compared to each potential reference spectrum from the sequence of potential reference spectra from the second substrate. This comparison includes a calculation of the difference between the potential reference spectrum from the first substrate and every potential reference spectrum from the second substrate to generate a plurality of difference values, and selection of the lowest difference value.

For example, the calculation can be expressed by the following equations:

$$A_{ijm} = \sum_{n=1}^{N} \sum_{\lambda=\lambda a}^{\lambda b} (I_{in}(\lambda) - I_{jm}(\lambda))^2$$

$$A_{ij} = \min(A_{ij1}, A_{ij2}, \ldots A_{ijM})$$

where $I_{in}(\lambda)$ is the potential reference spectrum for the $n^{th}$ sweep of the $i^{th}$ set-up substrate, $I_{jm}(\lambda)$ is the potential reference spectrum for the $m^{th}$ sweep of the $j^{th}$ set-up substrate, N is the total number of sweeps of the $i^{th}$ set-up substrate, M is the total number of sweeps of the $j^{th}$ set-up substrate, and $\lambda a$ to $\lambda b$ is a wavelength range over which the difference will be calculated.

In some implementations, rather than calculating a difference between the potential reference spectrum from the first substrate and every potential reference spectrum from the second substrate, each potential reference spectrum from the sequence of potential reference spectra from the first substrate can be compared to the potential reference spectrum having the same index value from the sequence of potential reference spectra from the second substrate. In this case, the calculation can be expressed as:

$$A_{ij} = \sum_{n=1}^{N} \sum_{\lambda=\lambda a}^{\lambda b} (I_{in}(\lambda) - I_{jn}(\lambda))^2$$

In some implementations, each potential reference spectrum of the first substrate can be compared to other potential reference spectra from the second substrate that have an index value within predetermined range of the index value of the potential reference spectrum of the first substrate.

The calculations above can use a sum of absolute differences rather than a sum of squared deviations. The calculation could also use a cross-correlation between spectra rather than a sum of squared deviations (in this case later steps which determine the lowest total or average difference could instead determine the greatest total or average cross-correlation).

For each set-up substrate, the total or average difference from all other set-up substrates can then be calculated. This calculation of the total or average difference can include summing the sequence of differences to generate a total difference. For a particular sequence of potential reference spectra, the calculation can be performed by summing the set of differences for between that particular sequence of reference spectra and the other sequences of the potential reference spectra. For example, an average difference $A_i$ can be calculated:

$$\langle A_i \rangle = \frac{1}{J-1} \sum_{\substack{j=1 \text{ to } J, j \neq i}}^{J} A_{ij}$$

where J is the total number of set-up substrates. A total difference can be calculated instead of an average difference, i.e., by omitting multiplication by $1/(J-1)$ (as shown by the table above).

The set-up substrate having the lowest total or average difference from all other set-up substrates, e.g., the substrate with the lowest value of $A_i$, is determined (step 654). The set-up substrate having the lowest total or average difference from all other set-up substrates can be selected as a reference substrate.

The sequence of potential reference spectra of this reference substrate are then selected as a reference spectra of a reference library to use for optical monitoring of product substrates (step 610).

Ultimately, one or more product substrates that have the same pattern as the set-up substrate are polished, and the reference spectra from the reference library are used for endpoint detection and/or adjustment of the polishing rate (step 612).

As noted above, the target index value can also be generated automatically. In some implementations, the first substrate is polished for a fixed polishing time, and the platen rotation number at the end of the fixed polishing time can be set as the target index value. In some implementations, instead of a fixed polishing time, some form of wafer-to-wafer feedforward or feedback control from the factory host or CMP tool (e.g., as described in U.S. application Ser. No. 12/625,480, incorporated by reference) can be used to adjust the polishing time for the first wafer. The platen rotation number at the end of the adjusted polishing time can be set as the target index value.

In some implementations, as shown in FIG. 1, the polishing system can include another endpoint detection system 180 (other than the spectrographic optical monitoring system 160), e.g., using friction measurement (e.g., as described in U.S. Pat. No. 7,513,818, incorporated by reference), eddy current (e.g., as described in U.S. Pat. No. 6,924,641, incorporated by reference), motor torque (e.g., as described in U.S. Pat. No. 5,846,882, incorporated by reference, or monochromatic light, e.g., a laser (e.g., as described in U.S. Pat. No. 6,719,818, incorporated by reference). The other endpoint detection system 180 can be in a separate recess 129 in the platen, or in the same recess 128 as the optical monitoring system 160. In addition, although illustrated in FIG. 1 as on the opposite side of the axis of rotation of the platen 125, this is not necessary, although the sensor of the endpoint detection system 180 can have the same radial distance from the axis 125 as the optical monitoring system 160. This other endpoint detection system 180 can be used to detect the polishing endpoint of the first substrate, and the platen rotation number at the time that the other endpoint detection system detects the endpoint can be set as the target index value. In some implementations, a post-polish thickness measurement of the first substrate can be made, and an initial target index value as determined by one of the techniques above can be adjusted, e.g., by linear scaling, e.g., by multiplying by the ratio of the target thickness to the post-polish measured thickness.

In addition, the target index value can be further refined based on new substrates processed and the new desired endpoint time. In some implementations, rather than using just the first substrate to set the target index value, the target index can be dynamically determined based on a multiple previously polished substrates, e.g., by combining, e.g., weighted averaging, of the endpoint times indicated by the wafer-to-wafer feedforward or feedback control or the other endpoint detection systems. A predefined number of the previously polished substrates, e.g., four or less, that were polished immediately prior to the present substrate, can be used in the calculation.

In any event, once a target index value has been determined, one or more subsequent substrates can be polished using the techniques described below to adjust the pressure applied to one or more zones so that the zones reach the target index at closer to the same time (or at an expected endpoint time, are closer to their target index) than without such adjustment.

As noted above, for each zone of each substrate, based on the sequence of measured spectra or that zone and substrate, the controller 190 can be programmed to generate a sequence of best matching spectra. A best matching reference spectrum can be determined by comparing a measured spectrum to the reference spectra from a particular library.

In some implementations, the best matching reference spectrum can be determined by calculating, for each reference spectra, a sum of squared differences between the measured spectrum and the reference spectrum. The reference spectrum with the lowest sum of squared differences has the best fit. Other techniques for finding a best matching reference spectrum are possible, e.g., lowest sum of absolute differences, or greatest cross-correlation.

A method that can be applied to decrease computer processing is to limit the portion of the library that is searched for matching spectra. The library typically includes a wider range of spectra than will be obtained while polishing a substrate. During substrate polishing, the library searching is limited to a predetermined range of library spectra. In some embodiments, the current rotational index N of a substrate being polished is determined. For example, in an initial platen rotation, N can be determined by searching all of the reference spectra of the library. For the spectra obtained during a subsequent rotation, the library is searched within a range of freedom of N. That is, if during one rotation the index number is found to be N, during a subsequent rotation which is X rotations later, where the freedom is Y, the range that will be searched from (N+X)−Y to (N+X)+Y.

Figure 8:
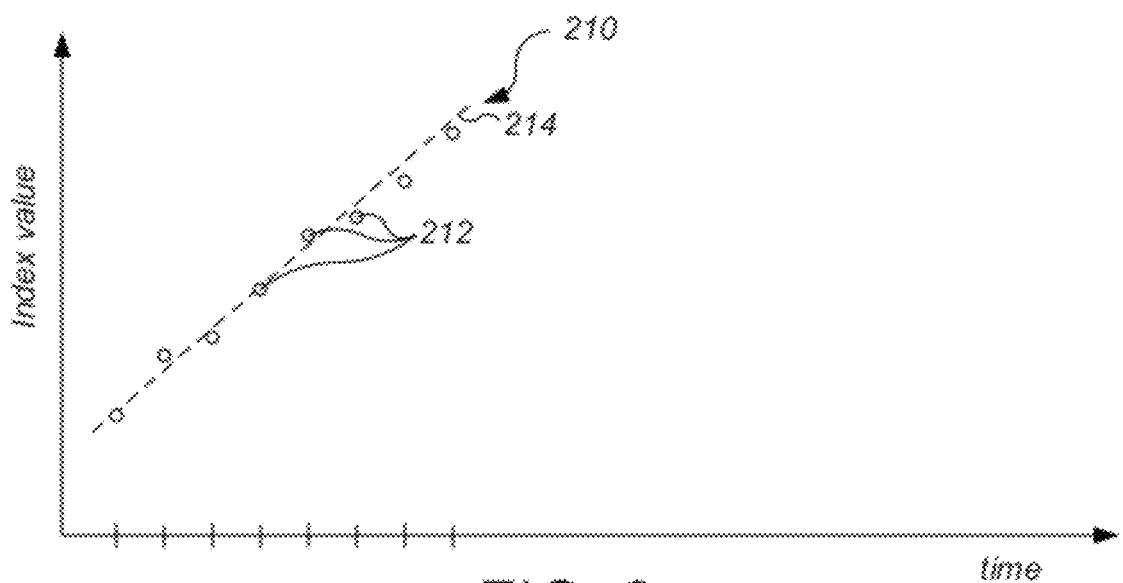
FIG. 8 illustrates an index trace.

Referring to FIG. 8, which illustrates the results for only a single zone, the index value of each of the best matching spectra in the sequence can be determined to generate a time-varying sequence of index values 212. This sequence of index values can be termed an index trace 210. In some implementations, an index trace is generated by comparing each measured spectrum to the reference spectra from exactly one library. In general, the index trace 210 can include one, e.g., exactly one, index value per sweep of the optical monitoring system below the substrate.

For a given index trace 210, where there are multiple spectra measured for a particular substrate and zone in a single sweep of the optical monitoring system (termed "current spectra"), a best match can be determined between each of the current spectra and the reference spectra of one or more, e.g., exactly one, library. In some implementations, each selected current spectra is compared against each reference spectra of the selected library or libraries. Given current spectra e, f, and g, and reference spectra E, F, and G, for example, a matching coefficient could be calculated for each of the following combinations of current and reference spectra: e and E, e and F, e and G, f and E, f and F, f and G, g and E, g and F, and g and G. Whichever matching coefficient indicates the best match, e.g., is the smallest, determines the best-matching reference spectrum, and thus the index value. Alternatively, in some implementations, the current spectra can be combined, e.g., averaged, and the resulting combined spectrum is compared against the reference spectra to determine the best match, and thus the index value.

In some implementations, for at least some zones of some substrates, a plurality of index traces can be generated. For a given zone of a given substrate, an index trace can be generated for each reference library of interest. That is, for each reference library of interest to the given zone of the given substrate, each measured spectrum in a sequence of measured spectra is compared to reference spectra from a given library, a sequence of the best matching reference spectra is determined, and the index values of the sequence of best matching reference spectra provide the index trace for the given library.

In summary, each index trace includes a sequence 210 of index values 212, with each particular index value 212 of the sequence being generated by selecting the index of the reference spectrum from a given library that is the closest fit to the measured spectrum. The time value for each index of the index trace 210 can be the same as the time at which the measured spectrum was measured.

Figure 9:
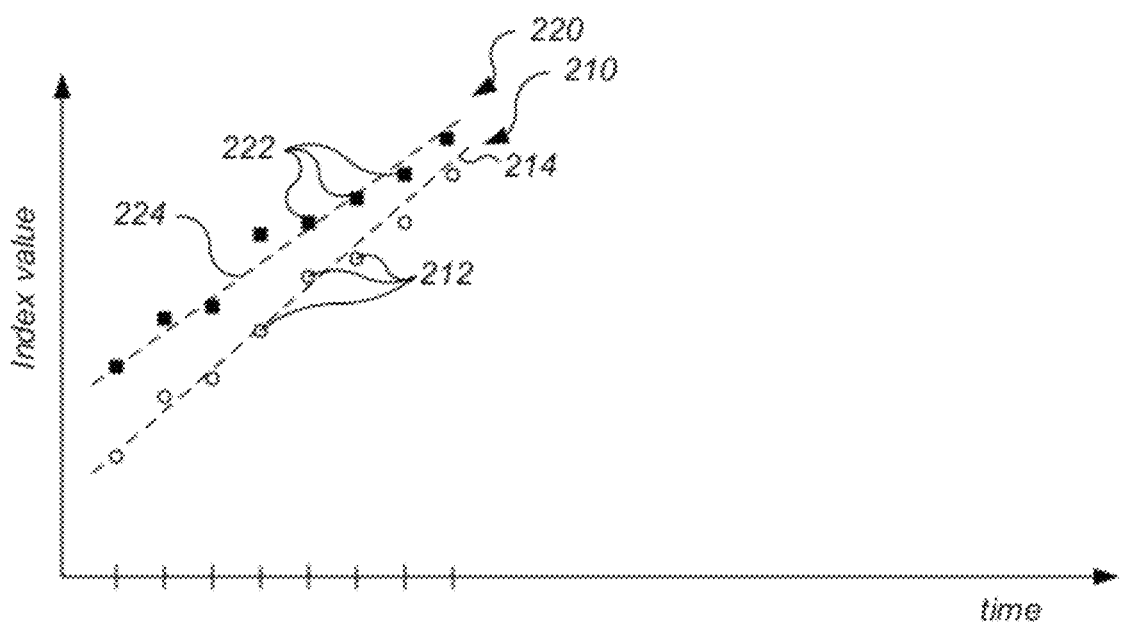
FIG. 9 illustrates a plurality of index traces for different zones of a product substrate.

Referring to FIG. 9, a plurality of index traces is illustrated. As discussed above, an index trace can be generated for each zone. For example, a first sequence 210 of index values 212 (shown by hollow circles) can be generated for a first zone, and a second sequence 220 of index values 222 (shown by solid squares) can be generated for a second zone.

Figure 10:
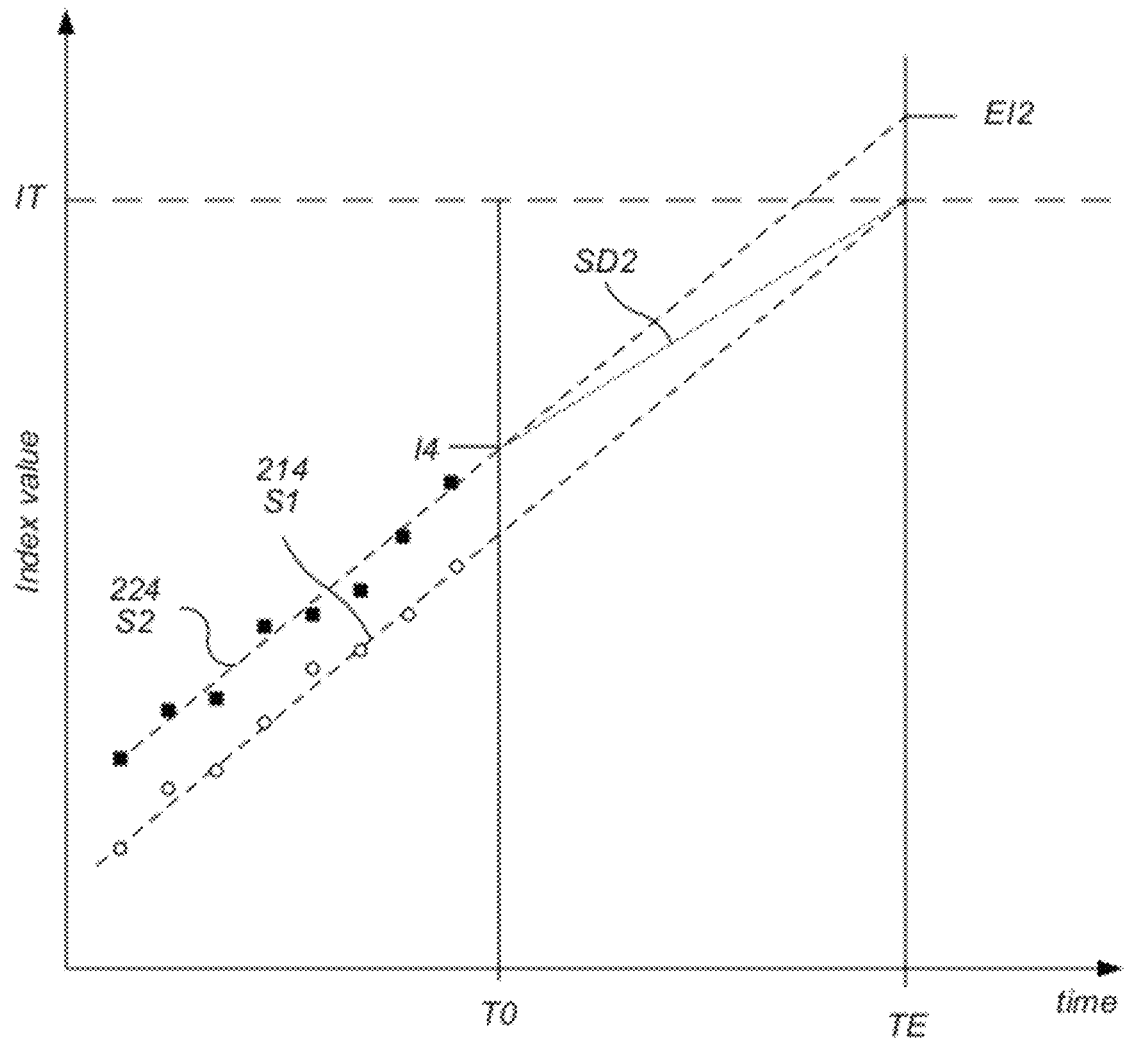
FIG. 10 illustrates a calculation of a plurality of desired slopes for a plurality of adjustable zones based on a time that an index trace of a reference zone reaches a target index.

As shown in FIG. 10, for each substrate index trace, a polynomial function of known order, e.g., a first-order function (e.g., a line) is fit to the sequence of index values for the associated zone and wafer, e.g., using robust line fitting. For example, a first line 214 can be fit to index values 212 for the first zone, and a second line 224 can be fit to the index values 222 of the second zone. Fitting of a line to the index values can include calculation of the slope S of the line and an x-axis intersection time T at which the line crosses a starting index value, e.g., 0. The function can be expressed in the form $I(t)=S \cdot (t-T)$, where t is time. The x-axis intersection time T can have a negative value, indicating that the starting thickness of the substrate layer is less than expected. Thus, the first line 214 can have a first slope S1 and a first x-axis intersection time T1, the second line 224 can have a second slope S2 and a second x-axis intersection time T2.

By determining a polishing rate for each zone from in-situ measurements, a projected endpoint time for a target thickness or a projected thickness for target endpoint time can be determined for each zone, and the polishing rate for at least one zone can be adjusted so that the substrates achieve closer endpoint conditions. By "closer endpoint conditions," it is meant that the zones would reach their target thickness closer to the same time than without such adjustment, or at the time that polishing is halted, that the zones would have closer to the same thickness than without such adjustment.

Referring to FIG. 10, in some implementations, one zone is selected as a reference zone, and a projected endpoint time TE at which the reference zone will reach a target index IT is determined. For example, as shown in FIG. 8, the first zone is selected as the reference zone, although a different zone and/or a different substrate could be selected. The target thickness IT is set by the user prior to the polishing operation and stored.

In order to determine the projected time at which the reference zone will reach the target index, the intersection of the line of the reference zone, e.g., line 214, with the target index, IT, can be calculated. Assuming that the polishing rate does not deviate from the expected polishing rate through the remainder polishing process, then the sequence of index values should retain a substantially linear progression. Thus, the expected endpoint time TE can be calculated as a simple linear interpolation of the line to the target index IT, e.g., $IT=S \cdot (TE-T)$.

One or more zones, e.g., all zones, other than the reference zone can be defined as adjustable zones. Where the lines for the adjustable zones meet the expected endpoint time TE define projected endpoint for the adjustable zones. The linear function of each adjustable zone, e.g., line 224 in FIG. 10, can thus be used to extrapolate the index, e.g., EI2, that will be achieved at the expected endpoint time ET for the associated zone. For example, the second line 224 can be used to extrapolate the expected index, EI2, at the expected endpoint time ET for the second zone.

As shown in FIG. 10, if no adjustments are made to the polishing rate of any of the zones of any the substrates after time T0, then when polishing is halted, each zone can have a different thickness. Here, for example, the second zone (shown by line 224) would endpoint at an expected index EI2 greater (and thus a thickness less) than the expected index of the first zone.

If, as shown in FIG. 10, the adjustable zones will have different expected indexes at the projected endpoint time of the reference zone, the polishing rate of at least one zone can be adjusted upwardly or downwardly, such that the zones would reach the target index (and thus target thickness) closer to the same time than without such adjustment, e.g., at approximately the same time, or would have closer to the same index value (and thus same thickness), at the target time than without such adjustment, e.g., approximately the same index value (and thus approximately the same thickness).

Thus, in the example of FIG. 10, commencing at a time T0, at least one polishing parameter for the second zone of the first substrate is modified so that the polishing rate of the zone is decreased (and as a result the slope of the index trace 220 is decreased). As a result, both zones would reach the target index (and thus the target thickness) at approximately the same time.

In some implementations, if the projected index at the expected endpoint time ET indicate that a zone of the substrate is within a predefined range of the target thickness, then no adjustment may be required for that zone. The range may be 2%, e.g., within 1%, of the target index.

The polishing rates for the adjustable zones can be adjusted so that all of the zones are closer to the target index at the expected endpoint time than without such adjustment. For example, a reference zone of the reference substrate might be chosen and the processing parameters for all of the other zone adjusted such that all of the zones will endpoint at approximately the projected time of the reference substrate. The reference zone can be, for example, a predetermined zone, e.g., the center zone 148a or the zone 148b immediately surrounding the center zone, the zone having the earliest or latest projected endpoint time of any of the zones of any of the substrates, or the zone of a substrate having the desired projected endpoint. The earliest time is equivalent to the thinnest substrate if polishing is halted at the same time. Likewise, the latest time is equivalent to the thickest substrate if polishing is halted at the same time. The reference substrate can be, for example, a predetermined substrate, a substrate having the zone with the earliest or latest projected endpoint time of the substrates. The earliest time is equivalent to the thinnest zone if polishing is halted at the same time. Likewise, the latest time is equivalent to the thickest zone if polishing is halted at the same time.

For each of the adjustable zones, a desired slope for the index trace can be calculated such that the adjustable zone reaches the target index at the same time as the reference zone. For example, the desired slope SD can be calculated from (IT−I)=SD*(TE−T0), where I is the index value (calculated from the linear function fit to the sequence of index values) at time T0 polishing parameter is to be changed, IT is the target index, and TE is the calculated expected endpoint time. In the example of FIG. 8, for the second zone of the first substrate, the desired slope SD2 can be calculated from (IT−I2)=SD2*(TE−T0).

In some implementations, there is no reference zone, and the expected endpoint time can be a predetermined time, e.g., set by the user prior to the polishing process, or can be calculated from an average or other combination of the expected endpoint times of two or more zones (as calculated by projecting the lines for various zones to the target index) from one or more substrates. In some implementations, there are different target indexes for different zones. This permits the creation of a deliberate but controllable non-uniform thickness profile on the substrate.

The polishing rates can be adjusted by, for example, increasing or decreasing the pressure in a corresponding chamber of a carrier head. The change in polishing rate can be assumed to be directly proportional to the change in pressure, e.g., a simple Prestonian model. For example, for each zone of each substrate, where zone was polished with a pressure Pold prior to the time T0, a new pressure Pnew to apply after time T0 can be calculated as Pnew=Pold*(SD/S), where S is the slope of the line prior to time T0 and SD is the desired slope.

For example, assuming that pressure Pold1 was applied to the first zone and pressure Pold2 was applied to the second zone of the first substrate, then new pressure Pnew1 for the first zone can be calculated as Pnew1=Pold1*(SD1/S1), and the new pressure Pnew2 for the second zone can be calculated as Pnew2=Pold2*(SD2/S2).

The process of determining projected times that the zones will reach the target thickness, and adjusting the polishing rates, can be performed just once during the polishing process, e.g., at a specified time, e.g., 40 to 60% through the expected polishing time, or performed multiple times during the polishing process, e.g., every thirty to sixty seconds. At a subsequent time during the polishing process, the rates can again be adjusted, if appropriate. During the polishing process, changes in the polishing rates can be made only a few times, such as four, three, two or only one time. The adjustment can be made near the beginning, at the middle or toward the end of the polishing process.

Polishing continues after the polishing rates have been adjusted, e.g., after time T0, and the optical monitoring system continues to collect spectra and determine index values for each zone. Once the index trace of a reference zone reaches the target index (e.g., as calculated by fitting a new linear function to the sequence of index values after time T0 and determining the time at which the new linear function reaches the target index), endpoint is called and the polishing operation stops. The reference zone used for determining endpoint can be the same reference zone used as described above to calculate the expected endpoint time, or a different zone (or if all of the zones were adjusted as described with reference to FIG. 10, then a reference zone can be selected for the purpose of endpoint determination). Rather than calculating an index value from the linear function, the index values themselves could be compared to the target index to determine the endpoint.

In some implementations, e.g., for copper polishing, after detection of the endpoint for a substrate, the substrate is immediately subjected to an overpolishing process, e.g., to remove copper residue. The overpolishing process can be at a uniform pressure for all zones of the substrate, e.g., 1 to 1.5 psi. The overpolishing process can have a preset duration, e.g., 10 to 15 seconds.

Referring to FIG. 11, a summary flow chart 650 is illustrated. A plurality of zones of a substrate are polished in a polishing apparatus (step 652), as described above. During this polishing operation, each zone of the substrate has its polishing rate controllable independently of the other zones by an independently variable polishing parameter, e.g., the pressure applied by the chamber in carrier head above the particular zone. During the polishing operation, the substrate is monitored (step 654) as described above, e.g., with a measured spectrum obtained from each zone. For each zone, the reference spectrum (e.g., from the library of reference spectra previously generated by method 600) that is the best match to the measured spectrum is determined (step 656). The index value for each reference spectrum that is the best fit is determined to generate sequence of index values (step 658). For each zone, a linear function is fit to the sequence of index values (step 660). In one implementation, an expected endpoint time that the linear function for a reference zone will reach a target index value is determined, e.g., by linear interpolation of the linear function (step 662). In other implementations, the expected endpoint time is predetermined or calculated as a combination of expected endpoint times of multiple zones. If needed, the polishing parameters for at least one zone is adjusted to adjust the polishing rate of that zone such that the plurality of zones reach the target thickness at approximately the same time or such that the plurality of zones have approximately the same thickness (or a target thickness) at the target time (step 664). Polishing continues after the parameters are adjusted, and for each zone, measuring a spectrum, determining the best matching reference spectrum from the library, determining the index value for the best matching spectrum to generate a new sequence of index values for the time period after the polishing parameter has been adjusted, and fitting a linear function to index values (step 666). Polishing can be halted once the index value for a reference zone (e.g., a calculated index value generated from the linear function fit to the new sequence of index values) reaches target index (step 670).

In some implementations, multiple substrates can be polished at the same platen. In this case, multiple substrates can be treated using the similar techniques as are used for multiple zones on a single substrate.

In some implementations, the light directed onto the substrate is stationary rather than rotating with the platen but is stationary. For example, a stationary light source could be positioned below the platen, and a hole through the platen could provide intermittent optical access to the substrate. In this case, the light would not sweep across different radial ranges of the substrate (unless the carrier head is moving laterally), so the multiple zones might not be used, but a single potential reference spectrum can still be generate is generated for each sweep of the optical access across the substrate.

The method used to adjust endpoints can be different based upon the type of polishing performed. For copper bulk polishing, a single eddy current monitoring system can be used. For copper-clearing CMP with multiple wafers on a single platen, a single eddy current monitoring system can first be used so that all of the substrates reach a first breakthrough at the same time. The eddy current monitoring system can then be switched to a laser monitoring system to clear and overpolish the wafers. For barrier and dielectric CMP with multiple wafers on a single platen, an optical monitoring system can be used.

In some implementations, where the polishing system includes another endpoint detection system (other than the spectrographic system), the pressures of the zones can be adjusted using the techniques described above, but the actual endpoint can be detected by the other endpoint detection system. For example, for copper polishing, this permits the spectrographic monitoring system to reduce residue and overpolishing, but permits the other system, e.g., the motor torque sensor or friction based sensor, which can be more reliable in determination of the polishing endpoint, to determine the polishing endpoint.

Returning to FIG. 1, the controller 190 can include a central processing unit (CPU) 192, a memory 194, and support circuits 196, e.g., input/output circuitry, power supplies, clock circuits, cache, and the like. In addition to receiving signals from the optical monitoring system 160 (and any other endpoint detection system 180), the controller 190 can be connected to the polishing apparatus 100 to control the polishing parameters, e.g., the various rotational rates of the platen(s) and carrier head(s) and pressure(s) applied by the carrier head. The memory is connected to the CPU 192. The memory, or computable readable medium, can be one or more readily available memory such as random access memory (RAM), read only memory (ROM), floppy disk, hard disk, or other form of digital storage. In addition, although illustrated as a single computer, the controller 190 could be a distributed system, e.g., including multiple independently operating processors and memories.

Embodiments of the invention and all of the functional operations described in this specification can be implemented in digital electronic circuitry, or in computer software, firmware, or hardware, including the structural means disclosed in this specification and structural equivalents thereof, or in combinations of them. Embodiments of the invention can be implemented as one or more computer program products, i.e., one or more computer programs tangibly embodied in a machine-readable storage media, for execution by, or to control the operation of, data processing apparatus, e.g., a programmable processor, a computer, or multiple processors or computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

The above described polishing apparatus and methods can be applied in a variety of polishing systems. Either the polishing pad, or the carrier heads, or both can move to provide relative motion between the polishing surface and the substrate. The light beam need not sweep across the substrate from edge to edge. For example, the platen may orbit rather than rotate, so that the light beam travels in a circular path on the substrate. In such cases, the potential reference spectra and measured spectra can be accumulated at a predetermined rate, e.g., 1-2 times per second, rather than once per rotation of the platen. The polishing pad can be a circular (or some other shape) pad secured to the platen. Some aspects of the endpoint detection system may be applicable to linear polishing systems, e.g., where the polishing pad is a continuous or a reel-to-reel belt that moves linearly. The polishing layer can be a standard (for example, polyurethane with or without fillers) polishing material, a soft material, or a fixed-abrasive material. Terms of relative positioning are used; it should be understood that the polishing surface and substrate can be held during polishing in a vertical orientation or some other orientation.

Particular embodiments of the invention have been described. Other embodiments are within the scope of the following claims.

What is claimed is:

1. A computer-implemented method of generating reference spectra, comprising:
    polishing a plurality of set-up substrates, the plurality of set-up substrates comprising at least three set-up substrates;
    measuring a sequence of multi-wavelength spectra from each of the plurality of set-up substrates during polishing with an in-situ optical monitoring system to provide a plurality of sequences of spectra;
    for each set-up substrate from the plurality if set-up substrates, generating a sequence of potential reference spectra from the sequence of multi-wavelength spectra for the set-up substrate, thereby generating a plurality of sequences of potential reference spectra from the plurality of sequences of spectra;
    determining which sequence of potential reference spectra of the plurality of sequences of potential reference spectra provides a best match to remaining sequences of the plurality of sequences of potential reference spectra, wherein determining comprises a round-robin comparison of each sequence of potential reference spectra against each other sequence of potential reference spectra; and
    selecting and storing the sequence of potential reference spectra determined to provide the best match as reference spectra.

2. The method of claim 1, wherein generating the plurality of sequences of potential reference spectra comprises generating a sequence of potential reference spectra from each sequence of multi-wavelength spectra.

3. The method of claim 2, wherein measuring the sequence of multi-wavelength spectra comprises, at each time interval of a plurality of regular time intervals, collecting a plurality of spectra from a set-up substrate, and wherein generating the sequence of potential reference spectra comprises, for each time interval, generating a single potential reference spectrum from the plurality of spectra.

4. The method of claim 3, wherein generating the single potential reference spectrum from the plurality of spectra comprises averaging the plurality of spectra.

5. The method of claim 3, wherein generating the potential reference spectrum from the plurality of spectra comprises determining which spectrum from the plurality of spectra provides a best match to spectra from other set-up substrates collected in the same time interval.

6. The method of claim 3, wherein the plurality of regular time intervals correspond to rotations of a platen supporting a polishing pad to polish the set-up substrate.

7. The method of claim 1, wherein determining which sequence of potential reference spectra of the plurality of sequences provides the best match comprises assigning an index value to each potential reference spectrum of the plurality of sequences of potential reference spectra.

8. The method of claim 7, wherein the index value corresponds to a number of rotations of a platen at a time of measurement of a spectrum of the sequence of multi-length spectra used to generate the potential reference spectrum.

9. The method of claim 7, wherein determining which sequence of potential reference spectra of the plurality of sequences provides the best match comprises comparing each sequence of potential reference spectra to each other sequence of the plurality of sequences of potential reference spectra.

10. The method of claim 9, wherein comparing each sequence of potential reference spectra to each other sequence comprises determining a difference between each potential reference spectrum of the each sequence of potential reference spectra only against potential reference spectra having a same index value.

11. The method of claim 9, wherein comparing each sequence of potential reference spectra to each other sequence comprises determining a difference between each potential reference spectrum of the each sequence of potential reference spectra from a first substrate against every potential reference spectrum from a second substrate.

12. The method of claim 7, wherein determining which sequence of potential reference spectra of the plurality of sequences provides the best match comprises determining a difference between each sequence of potential reference spectra and each other sequence of the plurality of sequences.

13. The method of claim 12, wherein determining a difference between each sequence of potential reference spectra and each other sequence of the plurality of sequences comprises determining a difference between each potential reference spectrum of the each sequence of potential reference spectra and a potential reference spectrum of the each other sequence having a same index value to generate a sequence of differences.

14. The method of claim 13, wherein determining a difference between each sequence of potential reference spectra and each other sequence of the plurality of sequences comprises summing the sequence of differences.

15. The method of claim 13, wherein determining a difference between each potential reference spectrum and a potential reference spectrum of the each other sequence comprises determining a sum of squared differentials.

16. The method of claim 13, wherein determining a difference between each potential reference spectrum and a potential reference spectrum of the each other sequence comprises determining a sum of absolute differences.

17. The method of claim 1, further comprising:
    polishing a product substrate,
    optically monitoring the product substrate during polishing to generate measured spectra; and
    determining at least one of a polishing endpoint or an adjustment for a polishing rate of the product substrate, the determining including a comparison of the measured spectra to the reference spectra.

18. The method of claim 17, wherein, optically monitoring the product substrate during polishing to generate measured spectra generates a sequence of measured spectra, and further comprising:
    for each measured spectrum in the sequence of measured spectra, determining a best matching reference spectrum from the reference spectra;
    for each best matching reference spectrum, determining an index value to generate a sequence of index values; and
    fitting a linear function to the sequence of index values.

19. The method of claim 18, wherein optically monitoring the product substrate during polishing to generate measured spectra generates a sequence of measured spectra for each zone of a plurality of zones on the product substrate, and wherein determining a best matching reference spectrum from the reference spectra, determining an index value and fitting a linear function to the sequence of index values are performed for each zone.

20. The method of claim 19, further comprising:

determining a projected time at which at least one zone of the product substrate will reach the target index value based on the linear function; and adjusting a polishing parameter for at least one zone on the product substrate to adjust the polishing rate of the at least one zone such that the at least one zone has closer to the target index at the projected time than without such adjustment.

21. The method of claim 18, further comprising detecting an endpoint based on a time that the linear function reaches a target index value.

* * * * *

UNITED STATES PATENT AND TRADEMARK OFFICE
CERTIFICATE OF CORRECTION

PATENT NO. : 8,755,928 B2  
APPLICATION NO. : 13/095802  
DATED : June 17, 2014  
INVENTOR(S) : Zhang et al.

Page 1 of 1

It is certified that error appears in the above-identified patent and that said Letters Patent is hereby corrected as shown below:

In the Claims

Claim 1, column 19, line 20, delete "if" and insert -- of --.

Claim 8, column 19, line 66, delete "multi-length" and insert -- multi-wavelength --.

Claim 18, column 20, line 53, delete "wherein," and insert -- wherein --.

Signed and Sealed this
Twenty-sixth Day of August, 2014

Michelle K. Lee
*Deputy Director of the United States Patent and Trademark Office*